United States Patent [19]
Doi

[11] Patent Number: 5,995,712
[45] Date of Patent: *Nov. 30, 1999

[54] IMAGE FORMING SYSTEM WITH CONTROL OF EXECUTING AN IMAGE COMBINE FUNCTION

[75] Inventor: Jun Doi, Kawasaki, Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/857,361

[22] Filed: May 15, 1997

[30] Foreign Application Priority Data

May 15, 1996 [JP] Japan ................................. 8-120637

[51] Int. Cl.[6] ............................. G06K 15/02; G06T 3/00; G06T 3/40; H04N 1/387; H04N 1/393
[52] U.S. Cl. .......................... 395/102; 395/116; 395/117; 358/450; 358/451; 358/444
[58] Field of Search ............................ 395/115–116, 117, 395/102; 358/450, 451, 401, 296, 300, 444, 468; 382/284, 298

[56] References Cited

U.S. PATENT DOCUMENTS 4,338,637  7/1982  Ueno ....................................... 358/468

FOREIGN PATENT DOCUMENTS

61-265964  11/1986  Japan ............................. H04N 1/387

*Primary Examiner*—Scott Rogers
*Attorney, Agent, or Firm*—Oblon, Spivak, McClelland, Maier & Neustadt, P.C.

[57] ABSTRACT

An image forming system with an image combine function. A copy function controller and an expanded function controller are provided. The copy function controller controls a copy process in which an image reading device reads document images and an image forming device forms images on recording paper sheets according to the images read by the image reading device by commands from the operation device. The expanded function controller controls an expanded function that uses at least one of the image reading device and the image forming device. The copy function controller has a combine copy function in which plural documents read by the image reading device are combined and formed on one recording paper sheet. The combine copy function is executed until after at least reading of all the document image data has been completed, even if a change command from the combine copy function to an expanded function is sent from the operation device while the combine copy function is executed.

6 Claims, 14 Drawing Sheets

IMAGE FORMING SYSTEM WITH CONTROL OF EXECUTING AN IMAGE COMBINE FUNCTION

BACKGROUND OF THE INVENTION

1. Field of the Invention

This invention relates to an image forming system, such as a printer, a copier, a facsimile, a multifunction system which includes functions of at least some of these devices, etc, which has an image combine function.

2. Discussion of the Background

In recent years, for responding to market needs of a space-saving copier, a copier which includes copying applications for copying, printing applications for printing and facsimile applications for sending and receiving facsimile data is known. In this type of copier, resources, for example an image reading device, an image forming device, an operation panel, a memory device, etc., are shared, and thus a space-saving is accomplished.

In this type of copier, the copying applications include several functions. For example, this type of copier may include a double-side copy function, in which two images read by the image read device are formed on double-sides of one recording paper sheet, and a combine function, in which two or more images read by the image reading unit are combined and formed on one recording paper sheet.

However, this background type of copier has the following problem. For the combine function to be carried out, if an operator selects another function of another application with the operation panel, this another function is carried out while the combine function is suspended.

SUMMARY OF THE INVENTION

Accordingly, it is an object of the present invention to overcome the drawbacks in the background art and to provide an image forming system which has a copy function controller and an expanded function controller.

To achieve this object, in one operation a copy function controller controls a copy process in which an image reading device reads document image data and an image forming device forms images on recording paper sheets according to the images read by the image reading device by commands from an operation device. The expanded function controller controls expanded functions that use at least one of the image reading device and the image forming device. The copy function controller has a combine copy function in which plural documents read by the image reading device are combined and formed on one recording paper sheet. Further, the combine copy function is executed until after at least a reading of all documents has been completed, even if a change command from a copy function to an expanded function is sent from the operation device while the copy combine function is executed. As a result, intermitting of the combine copy function is decreased and an efficiency of making a copy is enhanced.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Referring now to the drawings, wherein like reference numerals designate identical or corresponding parts throughout the several views, an embodiment of the present invention will now be described with reference to FIG. 1.

Figure 1:
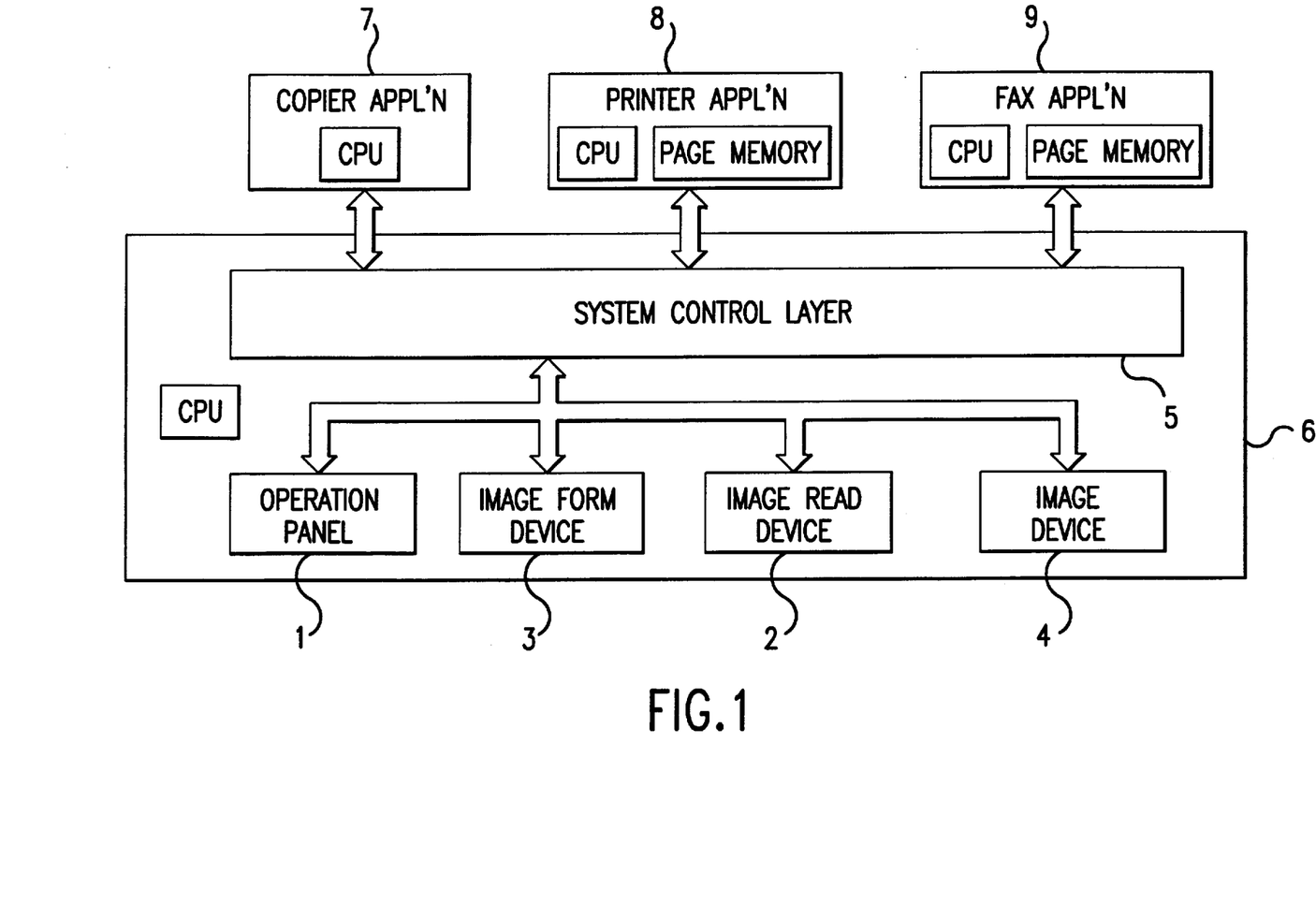
FIG. 1 is a diagram illustrating a construction of a digital copier in an embodiment of the present invention.

FIG. 1 shows a digital copier according to an embodiment of the present invention. This digital copier includes a system unit 6, which includes an operation panel 1, an image read device 2, an image form device 3, a memory device 4 and a system control layer 5. Moreover, the digital copier includes a copier application (abbreviated as APPL'N) 7, a printer application 8 and a FAX application 9. The copier application 7 includes a CPU, the printer application 8 includes a CPU and a page memory, and the FAX application 9 includes a CPU and a page memory.

Figure 4:
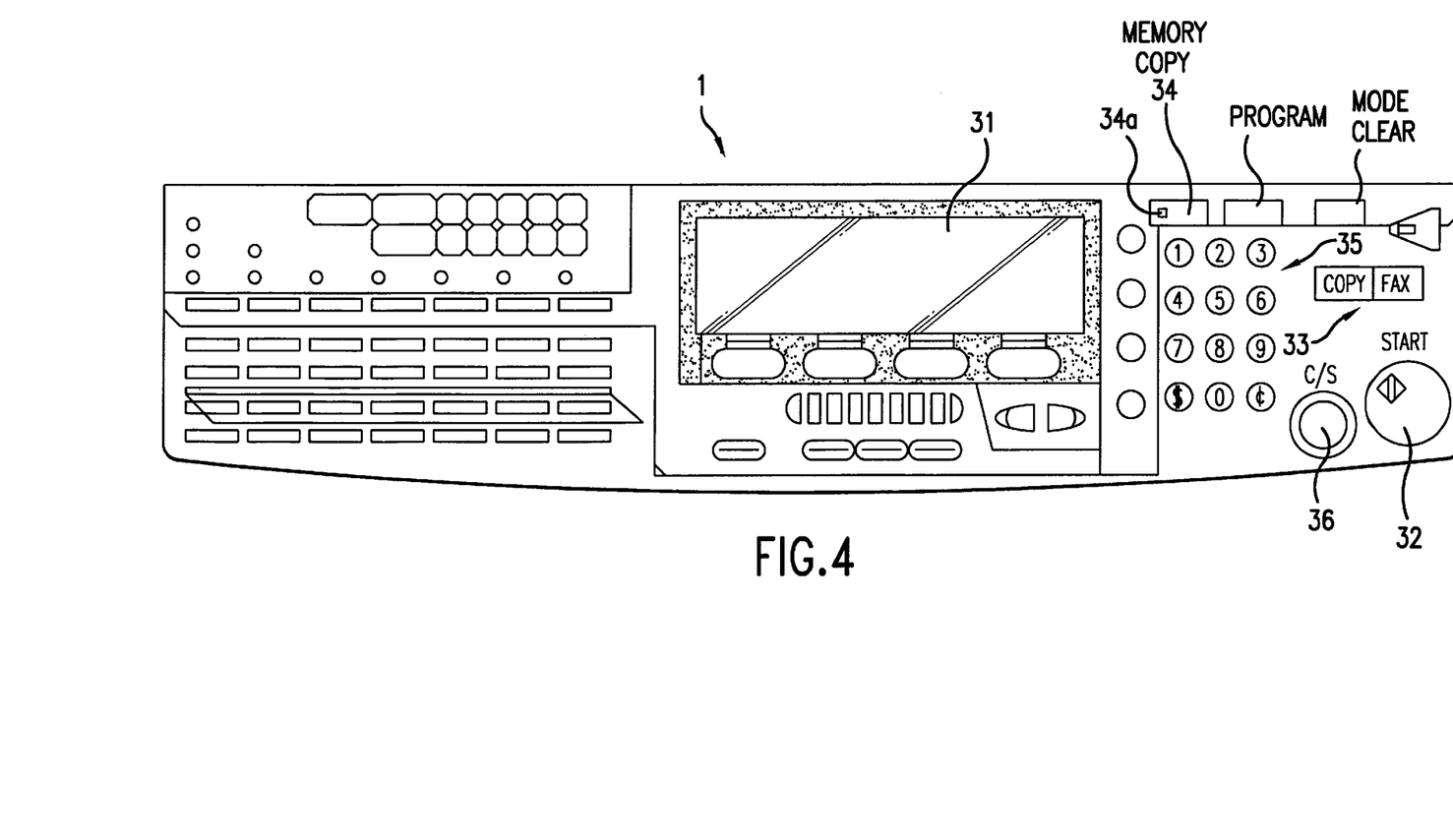
FIG. 4 is a diagram of an operation panel of a digital copier in an embodiment of the present invention.

The operation panel 1 is shown in greater detail in FIG. 4. The operation panel 1 includes a display 31, a start key 32, an application select switch 33, a memory copy key 34, a 10-button keypad 35, and a clear/stop key 36. The memory copy key 34 includes a memory copy mode indicator 34a.

In the image read device 2, original documents are illuminated by a source of light, and reflected light from the original documents is read by a CCD and converted to an electric signal.

The image form device 3 forms images on recording paper sheets according to electric signals from the image read device 2 by, for example, an electrophotographic system, an ink jet system, a thermal system, a thermal transfer system, etc. The memory device 4 is a memory for storing image data from the image read device 2. The system control layer 5 controls each device.

The copier application 7 carries out copier processes with the image read device 2 and the image form device 3. The copier processes may include, as examples, a normal copy process, a double-side copy process and a combine copy process. In the normal copy process, the image read device 2 reads original documents and the image form device 3 forms images on recording paper sheets according to the image data read by the image read device 2. In the double-side copy process, the image read device 2 reads two original document images sequentially and the image form device 3 forms each image on each side of one recording paper sheet according to the image data read by the image read device 2. In the combine copy process, the image read device 2 reads original documents sequentially and image data read by the image read device 2 are stored in the memory device 4. The image form device 3 then combines and forms two or more images on one recording paper sheet according to the image data stored in the memory device 4.

The printer application 8 carries out printing processes with the image form device 3. The image form device 3 can form images on recording paper sheets according to image data from an external apparatus, for example a personal computer, which is connected to the digital copier. The FAX application 9 carries out sending facsimile data with the image read device 2.

Figure 2:
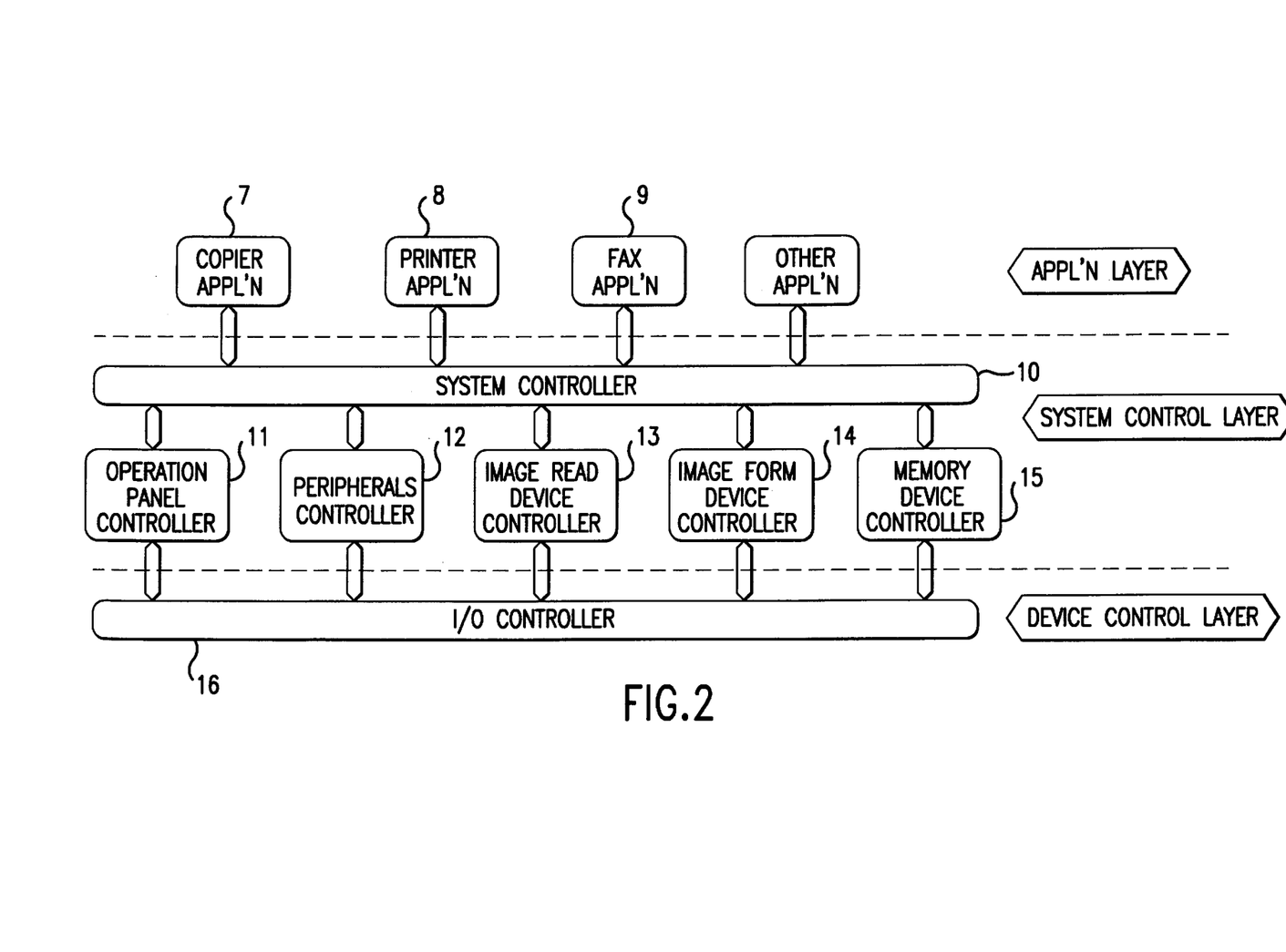
FIG. 2 is a block diagram of a digital copier in an embodiment of the present invention.

FIG. 2 is a further block diagram of the digital copier. The system control layer includes a system controller 10 which controls each device, an operation panel controller 11 which controls the operation panel 1, a peripherals controller 12 which controls peripherals, an image read device controller 13 which controls the image read device 2, an image form device controller 14 which controls the image form device 3 and a memory device controller 15 which controls the memory device 4. An input and output (I/O) controller 16 controls an input and output of an image signal and a control signal between each device.

Figure 3:
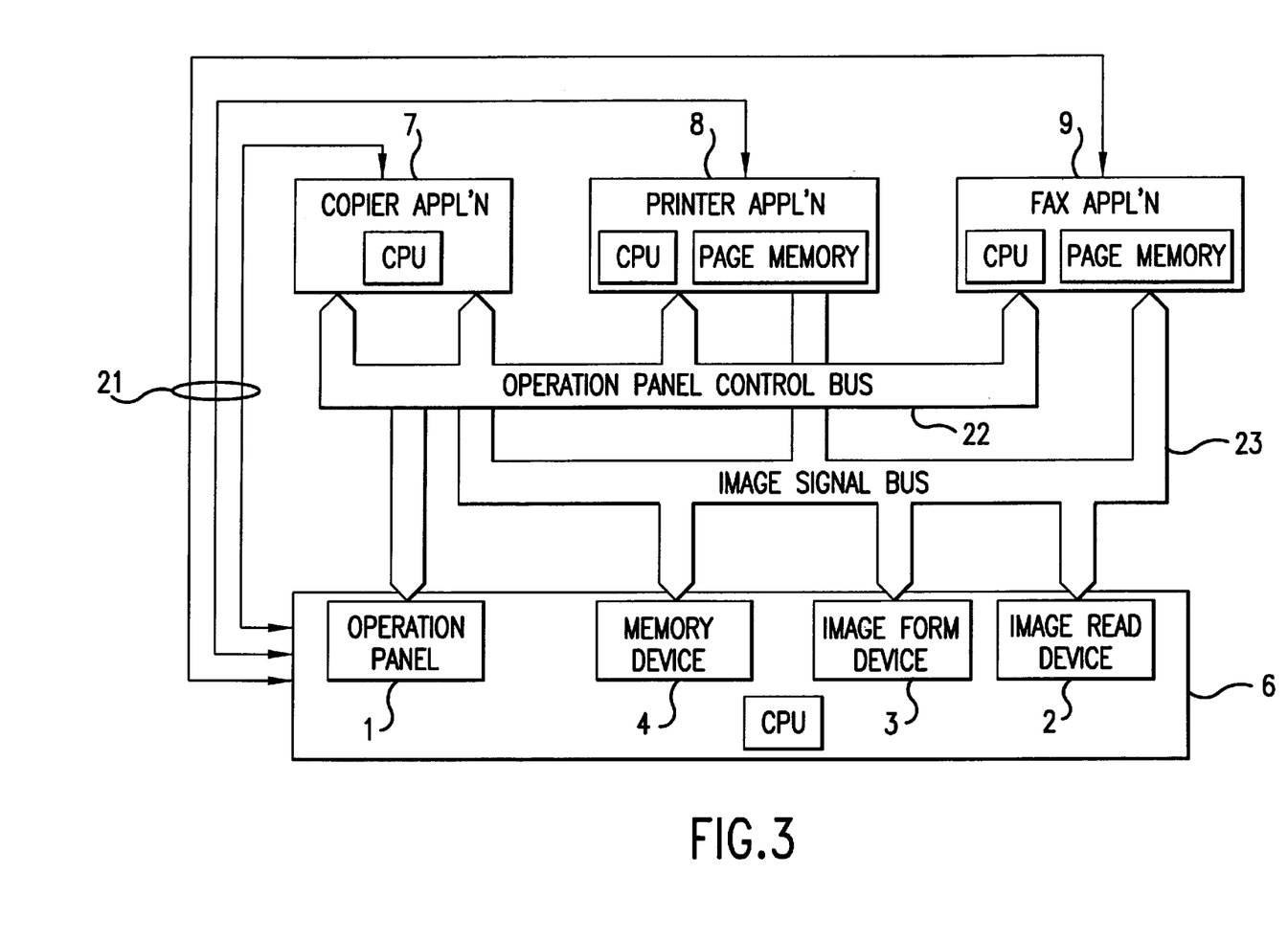
FIG. 3 shows relations of each device of a digital copier in an embodiment of the present invention.

FIG. 3 shows relations between each device. In this digital copier, a control signal line 21 connects each device in the system unit 6 and the copier application 7, the printer application 8 and the FAX application 9. An operation panel control bus 22 connects the operation panel 1 and the copier application 7, the printer application 8 and the FAX application 9. An image signal bus 23 connects the image read device 2, the image form device 3, the memory device 4 and each application.

Figure 5:
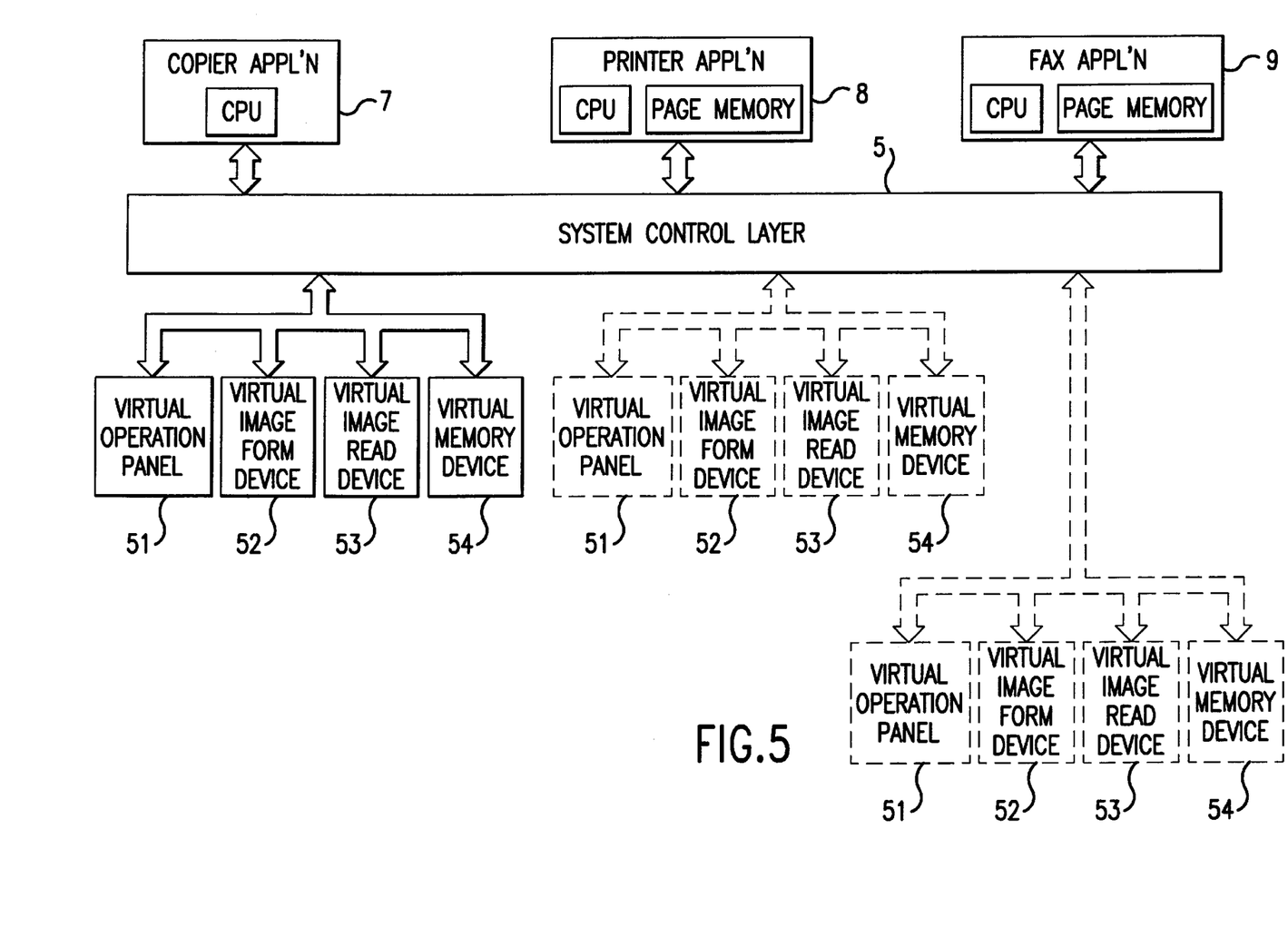
FIGS. 5, 6 and 7 show the utilization of resources of a digital copier in an embodiment of the present invention.
Figure 6:
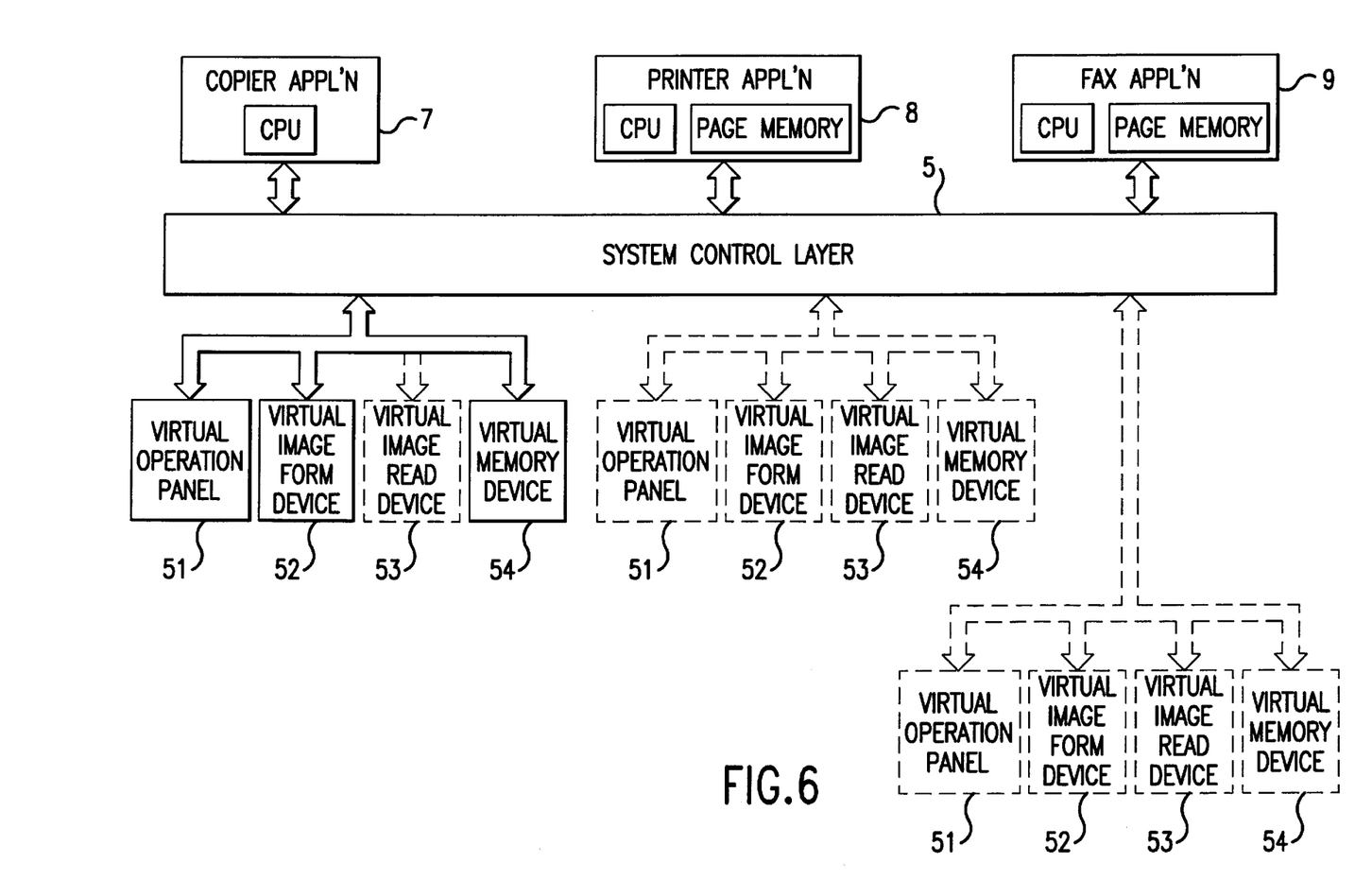
Figure 7:
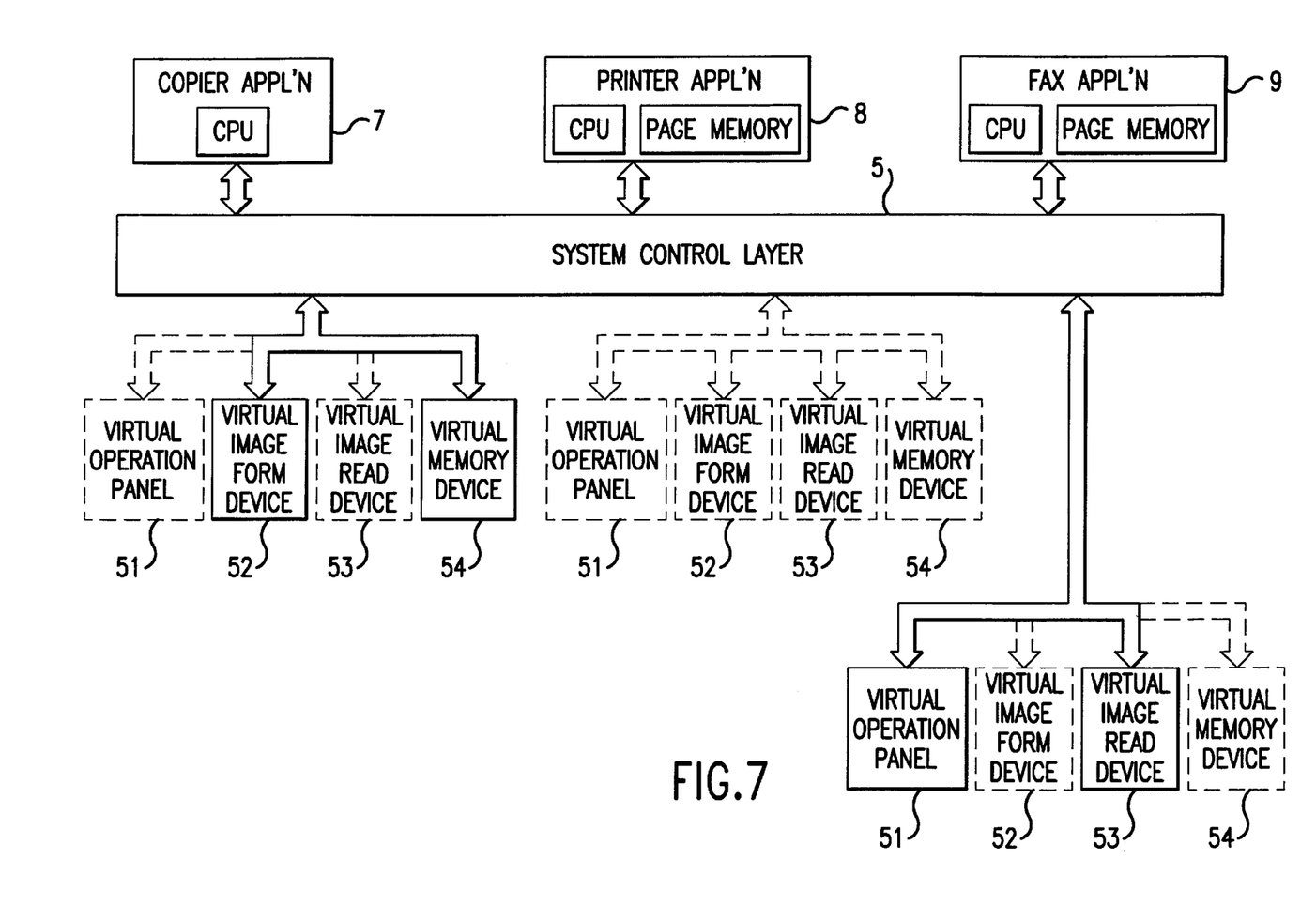

FIGS. 5, 6 and 7 show the utilization of resources. Functional units for a plurality of applications are each referred to as a resource. The system controller controls the system on a resource basis. In a digital copier to be described, the resources include a virtual operation panel 51, a virtual image form device 52, a virtual image read device 53, and a virtual memory device 54. In these figures, resources outlined by a solid line (versus a dashed line) line are being used by each application.

FIG. 5 shows a state in which the copier application 7 uses all the resources 51–54 of this digital copier (as denoted by the solid lines around the resources 51–54). The copier application 7 carries out the following copy processes. The image read device 2 reads original documents. The data of original documents read by the image read device 2 is sent to the memory device 4 and is stored therein. In tandem with this storing, the data of the original documents from the image read device 2 is sent to the image form device 3 and the image form device 3 forms images of original documents on recording paper sheets. In this process, start timings of an image read process by the image read device 2, an image store process by the memory device 4 and an image form process by the image form device 3 are synchronized.

In FIG. 6, the copier application 7 carries out the processes, for example a combine copy process, in which image data of original documents stored in the memory device 4 are read out and formed on recording paper sheets by the image form device 3 as a foreground application. In this process, the image read device 2 is not used (as denoted by the dashed lines about the virtual image read device 53).

In FIG. 7, the FAX application 9 carries out the process that the image read device 2 reads image data of original documents as a foreground application. And in tandem with this process of the FAX application 9, the copy application 7 carries out an image form process by the image form device 3 and the memory device 4 as a background application.

An operation panel available with a digital copier is often limited although the digital copier may be loaded with a plurality of applications. In such a case, the operation panel 1 has to be vacated for an application desired by a user. The application to which the right to use the section is handed over will be referred to as a foreground application. All the key inputs reported from the system controller to the foreground application appear on a display 31 included on this section. A background application refers to an application not having the right to use the display. However, even the background application does not have to interrupt the operation thereof. For example, assume that an application for executing a printer function, i.e., a printer application, is a background application. Then, if an image form device is not occupied and image data is received from a host, it is possible for the printer application to output image data on recording paper sheets. The system controller informs the background application of only limited key inputs and allows them to appear in a virtual picture assigned to the background application. A picture assigned to each application is referred to as a virtual picture. Hence, although a plurality of virtual pictures exist, only one of them appears on the display 31.

A combine copy process is a process in which the image read device 2 reads some original documents sequentially and the image data read by the image read device 2 are stored in the memory device 4. The image form device 3 then combines and forms two or more images on one recording paper sheet according to the image data stored in the memory device 4.

Figure 8:
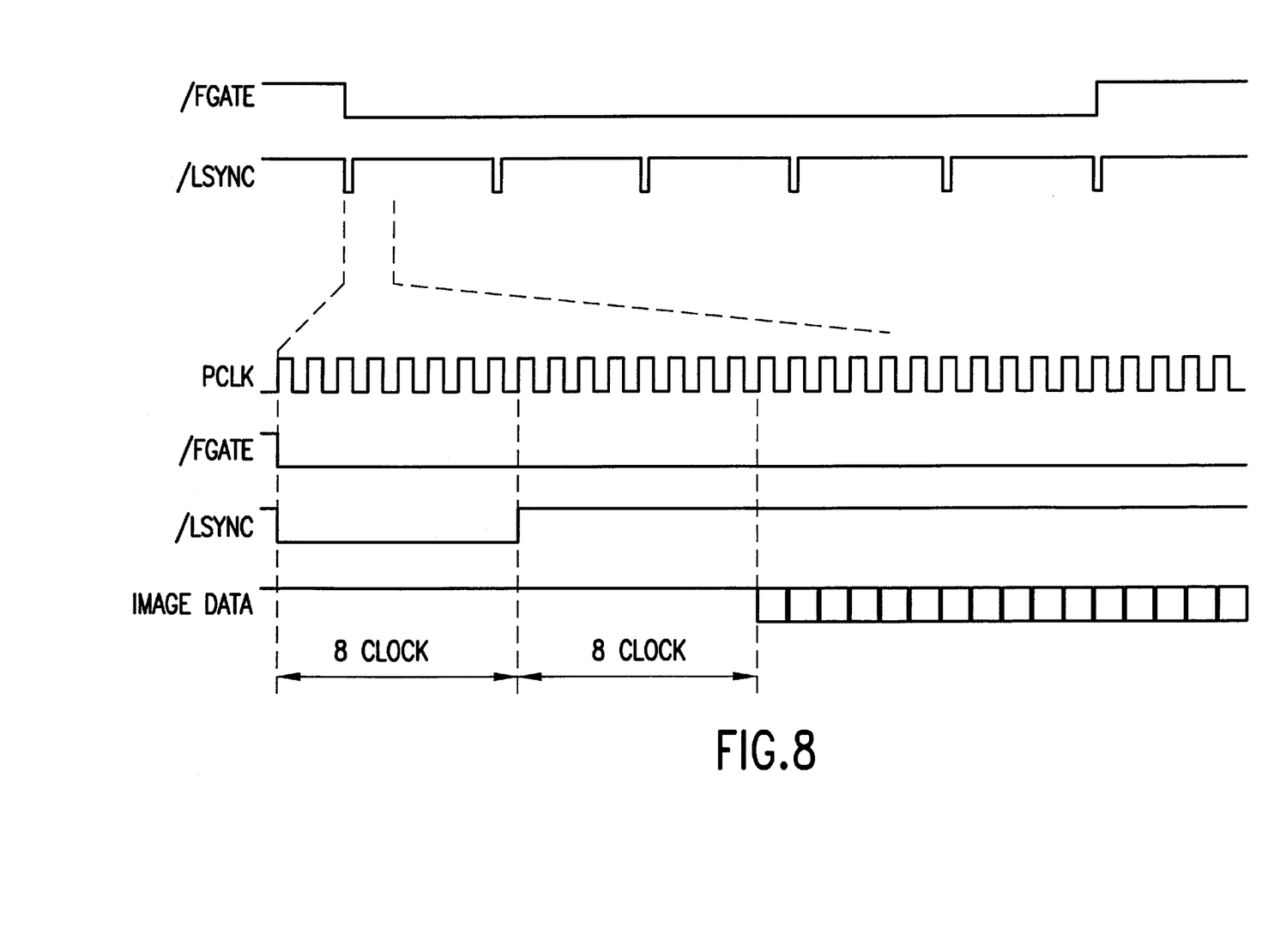
FIG. 8 is timing diagram of image data and control signals output from an image read device of a digital copier in an embodiment of the present invention.

FIG. 8 is timing diagram of image data and control signals output from the image read device 2. The signal /FGATE ("/" indicates low active) is a frame gate signal which shows a range of usefulness of an image in a direction of a sub-scanning, and when this frame gate signal is low, the image data becomes effective. This frame gate signal is asserted and negated when a line synchronization signal (/LSYNC) goes from a high to low transition.

The signal /LSYNC is asserted predetermined number of pixels when PCLK (pixel clock) goes from a low to high transition and after a predetermined number of pixels since /LSYNK goes from a low to high, image data becomes effective in the direction of a main scanning. The image data sent to the memory device 4 is sent according to the PCLK signal. The range of usefulness of an image in a direction of a sub-scanning is decided according to a size of a recording paper sheet.

Further, when the image data stored in the memory device 4 is sent to the image form device 3, the image data stored in the image memory device 4 is read out and sent to the image form device 3 in synchronism with the frame gate signal (/FGATE), the line synchronization signal (/LSYNC) and the pixel clock (PCLK).

Figure 9:
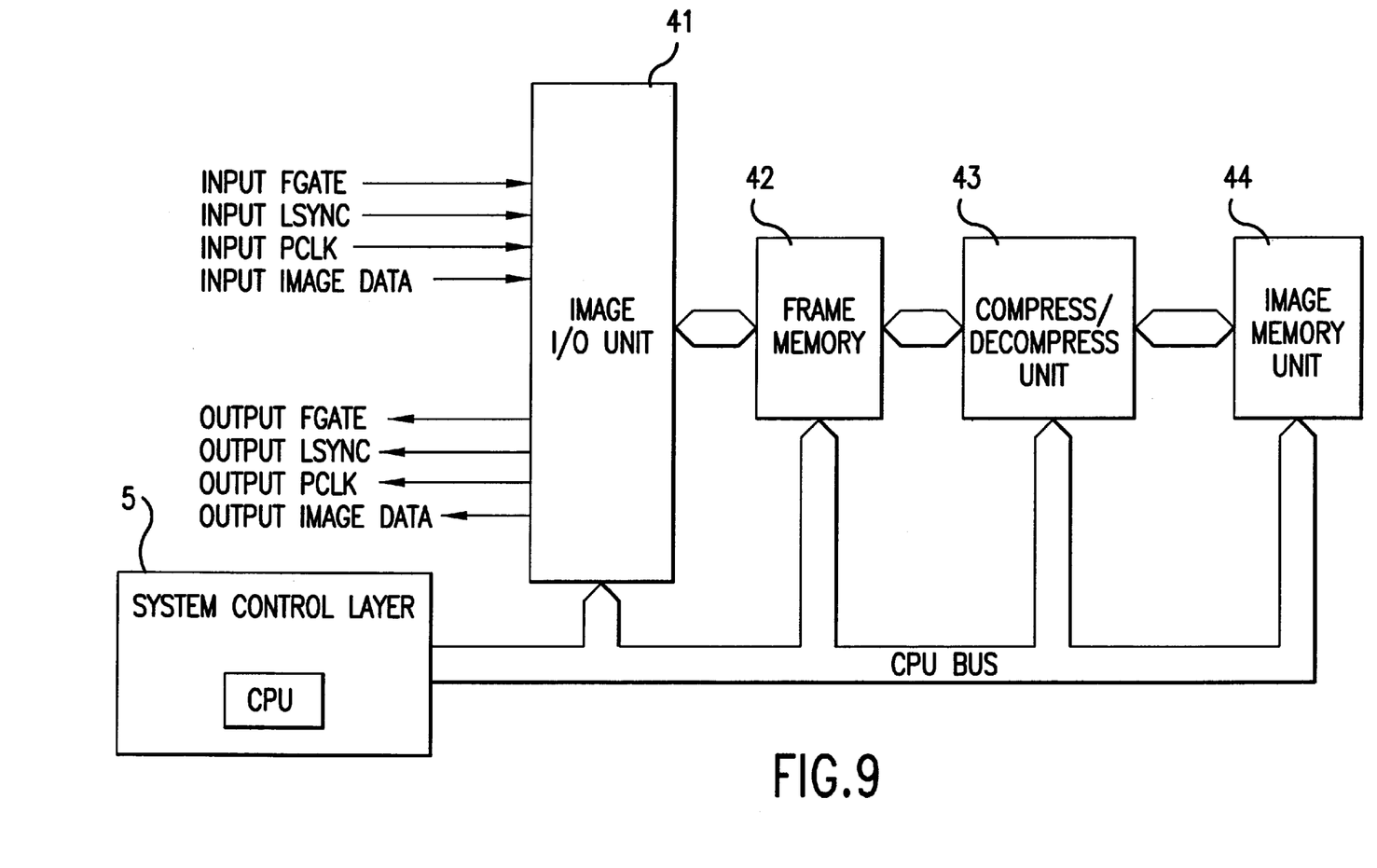
FIG. 9 is a block diagram of a memory device of a digital copier in an embodiment of the present invention.

FIG. 9 is a block diagram of the memory device 4. The memory device 4 includes an image I/O unit 41, a frame memory 42, a compress/decompress unit 43 and an image memory unit 44. The image I/0 unit 41 includes a CPU and logic circuits, and communicates with the system control layer 5 and receives commands from the system control layer 5. The image I/O unit 41 carries out processes according to a command from the system control layer 5 and sends status information of the memory device 4 to the system control layer 5.

For receiving a command of inputting image data from the system control layer 5, the input image data sent from the image read device 2 is stored in the frame memory 42 according to the input PCLK. For receiving a command of outputting image data from the system control layer 5, the image data stored in the frame memory 42 is read out, and is sent to the image form device 3 in synchronism with the output PCLK from the image form device 3.

For receiving a command to compress or decompress of image data, a command is sent to the compress/decompress unit 43 in timing of an input or output of image data. The frame memory 42 includes a semiconductor device, for example a DRAM, and in this digital copier, the frame memory 42 may include 4 MB memory. This frame memory 42 stores image data from the image I/O unit 41 or the compress/decompress unit 43. The compress/decompress unit 43 includes a CPU and logic circuits, and communicates with the system control layer 5 and receives commands from the system control layer 5. The compress/decompress unit 43 carries out processes according to a command from the system control layer 5 and sends a status information of a compress or decompress process to the system control layer 5.

For receiving a command of compressing image data from the image I/O unit 41, the compress/decompress unit 43 reads out image data from the frame memory 42 and compresses the image data. After compressing, the compressed image data is stored in the image memory unit 44. For receiving a command of decompressing the image data, the compress/decompress unit 43 reads out image data from the image memory unit 44 and decompresses the image data. After decompressing, the decompressed image data is stored in the frame memory 42.

The image memory unit 44 includes a semiconductor device, for example a DRAM, or a mass-storage device, for example a hard disk drive, a magneto-optic disc, etc. The image memory unit 44 stores the compressed image data from the compress/decompress unit 43.

In this digital copier, when the combine copy process is carried out, first the copier application 7 sends a command indicating transferring image data from the image read device 2 to the memory device 4, to the system control layer 5. When a reading of the first original document image is finished, the copier application 7 sends a command indicating transferring image data of a second original document from the image read device 2 to the memory device 4, to the system control layer 5. These processes are repeated for a number of copies input by an operator. For example, when the combine copy process is carried out with an ADF (auto document feeder), the ADF feeds the original documents set on an original documents tray to a reading position of the image read device 2 one by one, and the image read device 2 reads the original document images and sends the image data of the original documents to the memory device 4.

In the memory device 4, the image I/O unit 41 writes the image data from the image read device 2 to the frame memory 42, and then the image data stored in the frame memory 42 is read out and compressed by the compress/decompress unit 43. After this compressing operation, the compressed image data is stored in the image memory unit 44.

Figure 10:
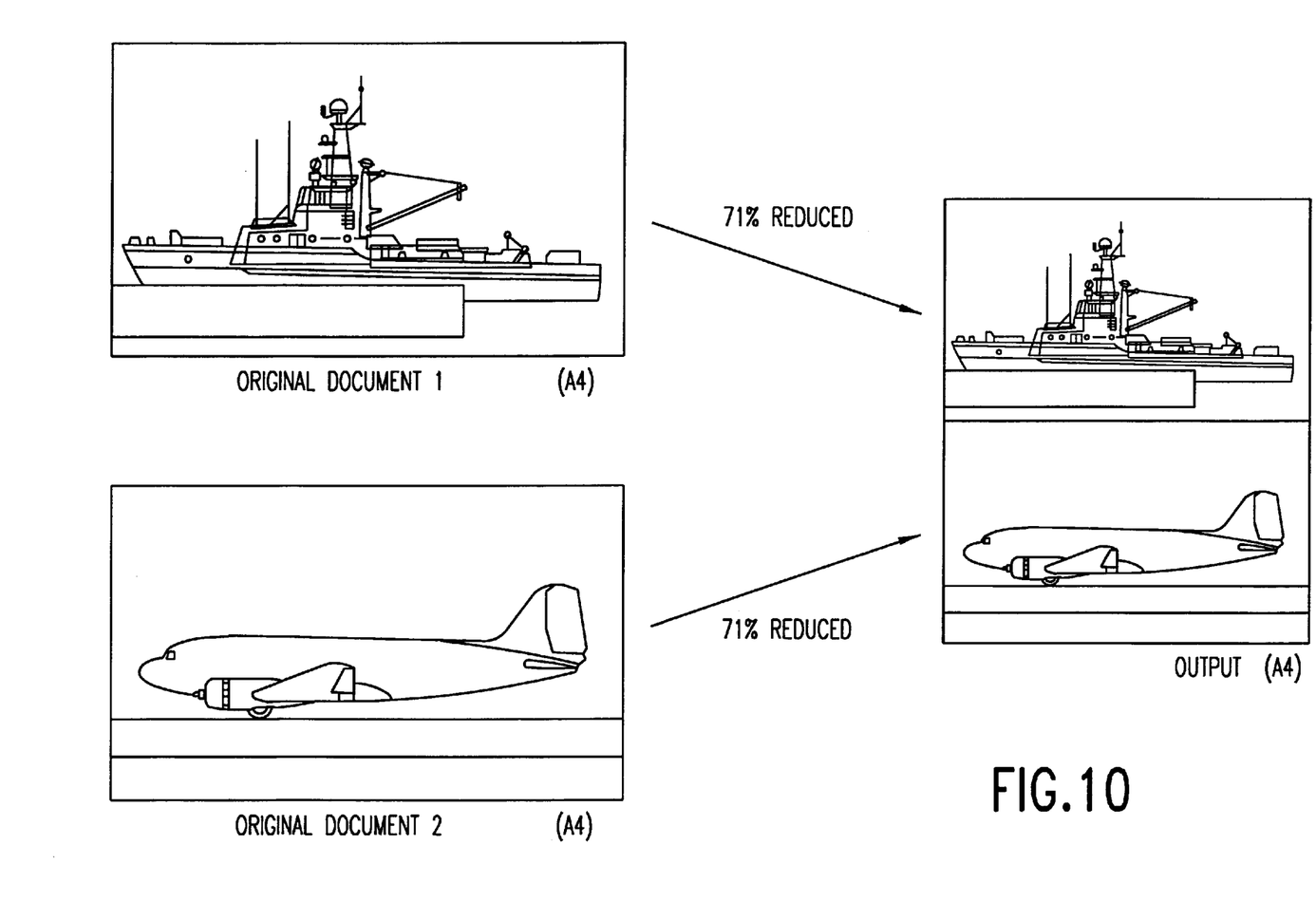
FIG. 10 shows samples of a combine copy by a digital copier in an embodiment of the present invention.

FIG. 10 shows an example of the combine copy process. In this case, two A4 original documents are combined and formed on one A4 recording paper sheet. Each original document image data is reduced at 71% and sent to the memory device 4. When four A4 original documents are combined, each original document image data is reduced at 50% and sent to the memory device 4. The copier application 7 controls a page management of image data.

After reading and compressing all document image data, the copier application 7 sends a command indicating decompressing image data and outputting decompressed image data from the memory device 4. In the memory device 4, first the image compress/decompress unit 43 reads out and decompresses the image data of the first page stored in the image memory unit 44. The decompressed image data is then stored in the frame memory 42 until image data of one page is stored in the frame memory 42. The image I/O unit 41 then transfers the image data stored in the frame memory 42 to the image form device 3, and the image form device 3 then forms an image on a recording paper sheet according to the image data from the memory device 4. The image I/O unit 41 carries out a user specified number of image data transferring operations.

When next pages of image data are present in the image memory unit 44, the compress/decompress unit 43 reads out and decompresses the next page image data and the decompressed image data is then stored in the frame memory 42. The image I/0 unit 41 then transfers the image data stored in the frame memory 42 to the image form device 3, and the image form device 3 then forms an image on a recording paper sheet according to the image data from the memory device 4. These image forming operations are carried out until there is no image data remaining in the image memory unit 44, in other words, the image forming operations are carried out for each number of original documents.

Figure 11:
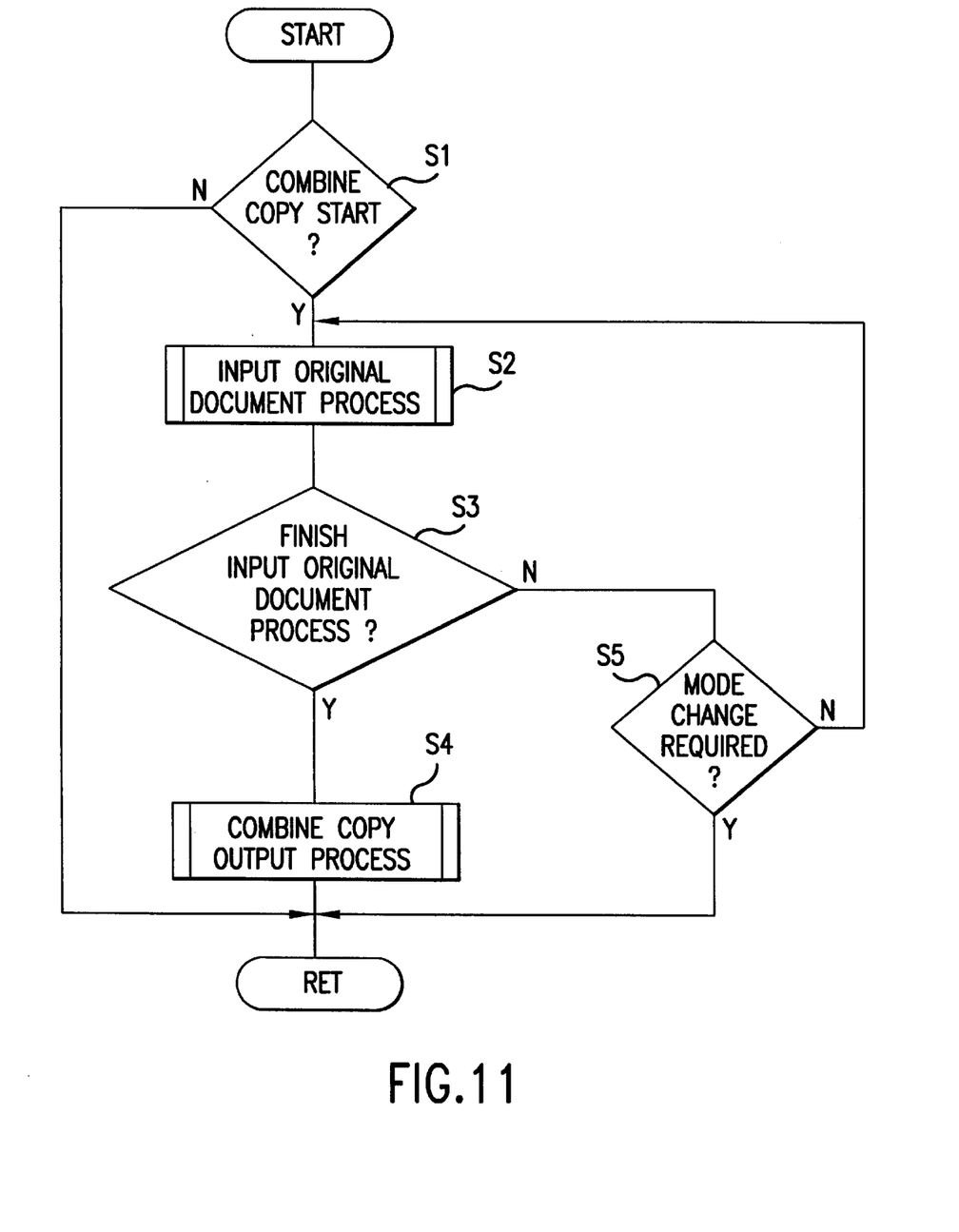
FIG. 11 is a flowchart of a process of a combine copy by a copier application of an embodiment of the present application.

FIG. 11 is a flowchart of the combine copy process by the copier application 7. This process is executed according to a call of a main process. In a step S1, when the combine copy process starts, the operation proceeds to step S2. The combine copy process is selected by an operator in step S1. An operator selects a copier application mode, and selects the combine copy mode by the memory copy key 34 and inputs a number of image data to be combined. Then, an operator inputs the number of copies by the 10-button keypad 35 and pushes the start key 32. When an operator selects the memory copy key 34, the memory copy mode indicator 34a comes on.

In the step S2, an input original document process is executed. The image read device 2 reads the first original document image with a reduction operation according to the number of image data to be combined. The image data from the image read device is then sent to the memory device 4 and is compressed by the compress/decompress unit 43 and stored in the image memory unit 44 in the memory device 4, as designed above. For using an ADF, before reading documents by the image read device 2, a first document is fed to the reading position of the image read device 2.

Next, in step S3, if the input original document process is finished, the operation proceeds to step S4. For using an ADF, an original document detection sensor detects the presence or absence of original documents on an original document tray. If there is no original document remaining on the original document tray, the operation proceeds to step S4, if there is an original document remaining on the original document tray, the operation proceeds to step S5. For an ADF, after reading every original document, an inquiry about the presence or absence of a next original document is executed by the display 31 on the operation panel 1, and a judgement is executed according to an operator input as to the presence or absence of a next original document using the operation panel 1.

In a step S5, whether a mode change required is detected, and if there is no mode change required, the application returns to step S2, and if a mode change is required, for example a change to the FAX application 9, the operation proceeds to return, and the combine copy process is intermitted and the required mode is executed.

Figure 12:
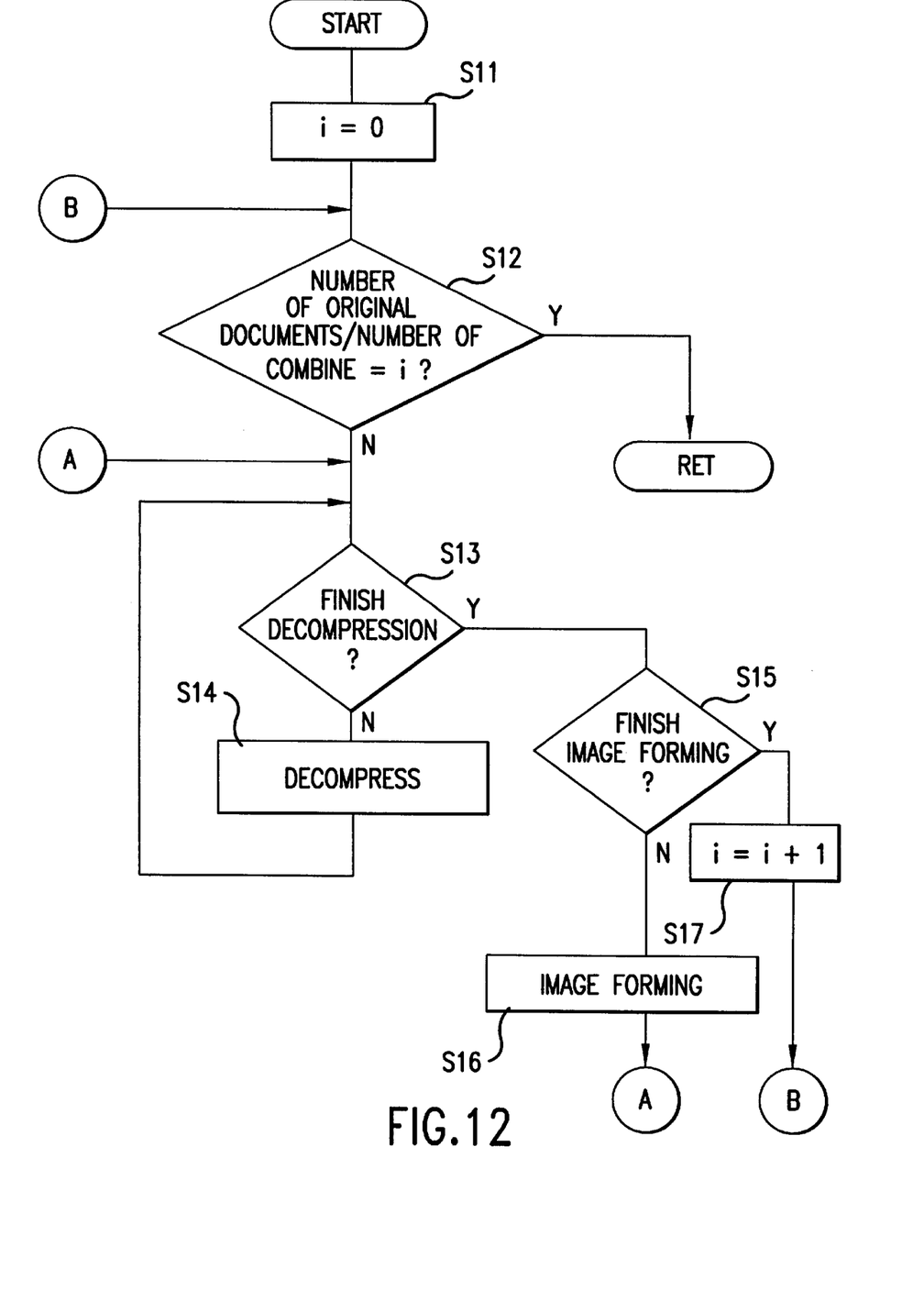
FIG. 12 is a flowchart of a combine copy process of an embodiment of the present invention.

In the step S4, the combine copy process is executed. FIG. 12 is a flowchart of the combine copy process. In a step S11, a counter is initialized "i=o" and the operation proceeds to step S12. In the step S12, whether the (number of original document/the number of combine) equals "i" or not is judged, and if the (number of original document/the number of combine) does not equal "i", the operation proceeds to step S13. The (number of original document/the number of combine) means the number of kinds of output combined copies. The number of all output-combined copies is the number of kinds of output-combined copies by the number of copies input by an operator.

In the step S13, whether the decompression of image data to be output on a next recording paper sheet is finished or not is judged. If decompression is not finished, the operation proceeds to step S14 and the compress/decompress unit 43 reads out image data from the image memory unit 44 and decompresses the image data. The decompressed image data is then stored in the frame memory 42, as discussed above. If decompression is finished, the operation proceeds to step S15, and in step S15, whether image forming of the input number is finished or not is judged. If image forming is not finished, the operation proceeds to step S16 and image forming is executed. If image forming is finished, the operation proceeds to step S17 and "i" is incremented by 1 and the operation then proceeds back to step S12.

Therefore, in the combine copy process by the copier application 7, at least reading of all original documents is finished when another application is selected by the operation panel 1, the operation panel 1 is changed for a selected application and the copier application 7 executes the combine copy process without operation panel 1, for example image forming, as a background application. If another application, for example the FAX application 9, is required while executing the combine copy process, image forming by the combine copy process is not intermitted until at least finishing of the reading of the original documents is completed. As a result, the number of intermitting of the combine copy process decreases and an efficiency of making a copy is improved.

Figure 13:
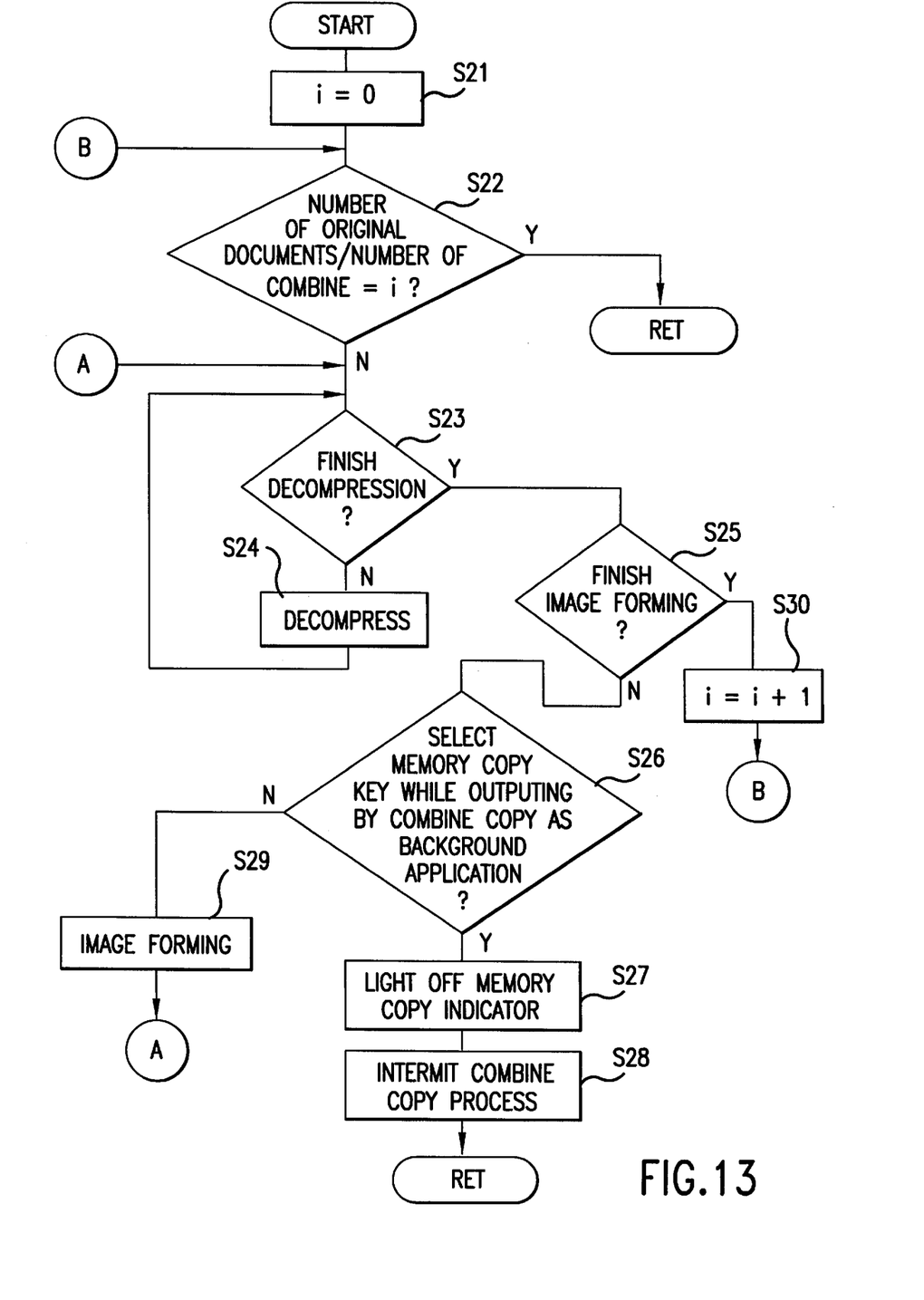
FIG. 13 is a flowchart of another combine copy process of an embodiment of the present invention.

FIG. 13 is a flowchart of another combine copy process. In FIG. 13, each of steps S21–S25 and S30 are the same as steps S11–S15 and S17 in FIG. 12, so only new steps S26–S29 are explained. In step S26, while the copier application 7 executes outputting by the combine copy process as a background application, whether the memory copy key 34 is pushed or not is judged. If the memory copy key is pushed while the copier application 7 executes outputting by the combine copy process as a background application, the operation proceeds to step S27, and the memory copy indicator 34a light is turned off and in step S28 the combine copy process is intermitted.

If the memory copy key 34 is not pushed while the copier application 7 executes outputting by the combine copy process as a background application, in other words if the copier application 7 executes outputting by the combine copy process as a foreground application, in step S29 an image forming is executed and the operation then proceeds back to step S23. In this case, if the clear/stop key 36 in FIG. 4 is pushed, the outputting by the combine copy process as a foreground application is intermitted. The clear/stop key 36 for common use by applications works for a present foreground application, and on the other hand the memory copy key 34 for only the copier application 7 works for the copier application 7.

Figure 14:
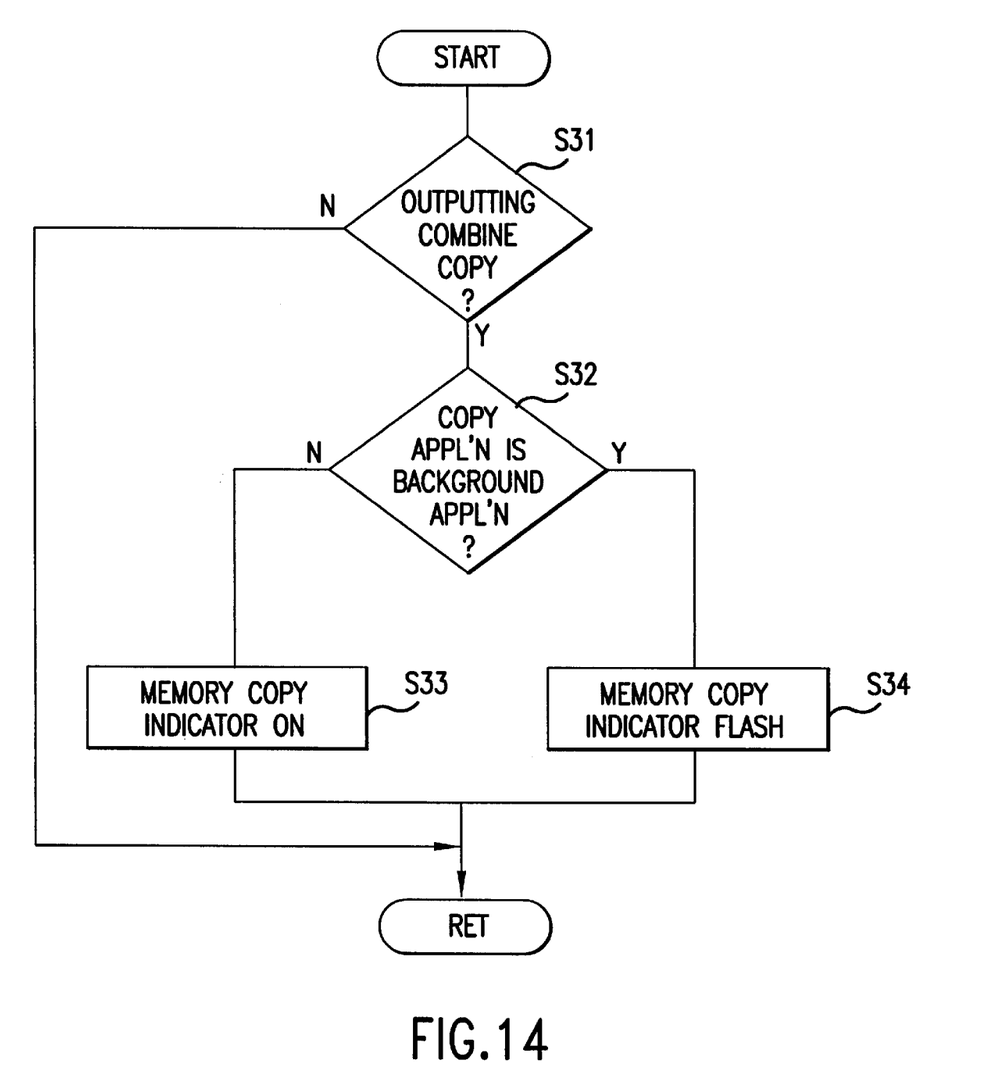
FIG. 14 is a flowchart of an operation of a memory copy indicator of an embodiment of the present invention.

FIG. 14 is a flowchart of an operation of the memory copy indicator 34a. In step S31, if the outputting combine copy process is not executed, the operation proceeds to return. If the outputting combine copy process is executed, the operation proceeds to step S32, and whether the copier application is a background application or not is judged. If the copier application is a background application, the operation proceeds to step S33 and the memory copy indicator 34a flashes (on and off) and the operation then proceeds to return. This flashing of the memory copy indicator 34a can cue an operator regarding working the copier application as a background application, and as a result, it can prevent a wrong operation, for example a withdrawal of a paper tray during an operation of the copier application 7 as a background application.

In the embodiment of the present invention noted above, the copier application 7 and the memory device 4 are different devices, but it is possible that the copier application 7 includes a comparable memory. In the embodiment, the mode change changes from the copier application 7 to another application according to input commands from the operation panel 1. But when a host computer, for example a personal computer, is connected with the digital copier and includes a scanner application, the mode change can also be changed from the copier application 7 to another application according to commands sent from the host computer. In this embodiment, the memory copy indicator 34a is set on the memory copy key 34. But it is also possible to provide an indication to an operator by another display, for example an LCD panel. In this embodiment, while the combine copy process is executed, the memory copy indicator 34a is flashing, but it is possible to keep this indicator light on. And in this embodiment, the applications are applied to a digital copier, but it is possible to apply such teachings to other image forming systems.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuit or by interconnecting an appropriate network of conventional components, as will be readily apparent to those skilled in the art.

Obviously, numerous additional modifications and variations of the present invention are possible in light of the above teachings. It is therefore to be understood that within the scope of the appended claims, the present invention may be practiced otherwise and as specifically described herein.

This application is based on Japanese patent application 8-120637 filed in the Japanese Patent Office on May 5, 1996, the entire contents of which are hereby incorporated by reference.

What is claimed as new and desired to be secured by Letters Patent of the United States is:

1. An image forming system which has an image combine function comprising:

an image reading device reading document image data;

an image forming device forming an image on a recording paper sheet;

an operation device inputting operation commands;

a copy function controller controlling a copy process of said image reading device and said image forming device for forming images according to the images read by said image reading device based on commands from said operation device;

an expanded function controller controlling an expanded function that uses at least one of said image reading device and said image forming device;

wherein said copy function controller has a combine copy function in which plural documents read by said image reading device are combined and formed on one recording paper sheet, and when a change command from a copy function to an expanded function is sent from said operation device while said combine copy function is executed, said operation device is changed for said expanded function, and the combine copy function is executed until after at least reading of all document image data to be combined has been completed for the combine copy function.

2. A system as claimed 1, further comprising an indicator indicating executing of said combine copy function.

3. A system as claimed 2, further comprising a stop command input inputting a stop command that intermits a process of said combine copy function for said expanded function to be executed.

4. An image forming system which has an image combine function comprising:

image reading means for reading a document image;

image forming means for forming an image on a recording paper sheet;

an operation means for inputting operation commands;

a copy function control means for controlling a copy process of said image reading means and said image forming means for forming images according to the images read by said image reading means based on commands from said operation means;

an expanded function control means for controlling an expanded function that uses at least one of said image reading means and said image forming means;

wherein said copy function control means has a combine copy function in which plural documents read by said image reading means are combined and formed on one recording paper sheet, and when a change command from a copy function to an expanded function is sent from said operation means while said combine copy function is executed, said operation device is changed for said expanded function, and the combine copy function is executed until after at least reading of all document image data to be combined has been completed for the combine copy function.

5. A system as claimed 4, further comprising indicator means for indicating executing of said combine copy function.

6. A system as claimed 5, further comprising stop command input means for inputting a stop command that intermits a process of said combine copy function for said expanded function to be executed.

* * * * *